(12) United States Patent
Phaneuf et al.

(10) Patent No.: US 7,458,354 B1
(45) Date of Patent: Dec. 2, 2008

(54) INTAKE MANIFOLD TUNING ASSEMBLY

(75) Inventors: Edward Phaneuf, Madison Heights, MI (US); John Long, Auburn Hills, MI (US); Charles Greenlaw, Macomb Township, MI (US); Naser Hineiti, Novi, MI (US)

(73) Assignee: MAHLE Technology, Inc., Farmington Hills, MI (US)

( * ) Notice: Subject to any disclaimer, the term of this patent is extended or adjusted under 35 U.S.C. 154(b) by 28 days.

(21) Appl. No.: 11/801,177

(22) Filed: May 9, 2007

(51) Int. Cl.
*F02M 35/10* (2006.01)

(52) U.S. Cl. .............................. 123/184.35; 123/184.48; 123/184.53

(58) Field of Classification Search ............ 123/184.25, 123/184.26, 184.35, 184.36, 184.43, 184.44, 123/184.48, 184.49, 184.53, 184.59
See application file for complete search history.

(56) References Cited

U.S. PATENT DOCUMENTS

| | | | |
|---|---|---|---|
| 5,406,913 A | 4/1995 | Rutschmann | 123/184.36 |
| 5,632,239 A | 5/1997 | Patyi et al. | 123/184.36 |
| 5,687,684 A | 11/1997 | Verkleeren | 123/184.55 |
| 6,837,204 B1 | 1/2005 | Stuart | 123/184.55 |
| 6,983,727 B2 | 1/2006 | Narayanaswamy | 123/184.55 |
| 7,131,416 B2 | 11/2006 | Sasaki et al. | 123/184.36 |

*Primary Examiner*—Noah Kamen
(74) *Attorney, Agent, or Firm*—Bliss McGlynn, P.C.

(57) ABSTRACT

The present invention relates to an intake manifold including first and second plenums in fluid communication with the throttle body and a plurality of runners depending from the plenums to direct air into the cylinders of an engine. Each of the runners includes a vent to release pressurized air within the runner. The intake manifold tuning assembly further includes a tuning device disposed between the plenums, the tuning device includes a housing having a plurality of tuning ports aligned relative to the vents to receive pressurized air from the runners. An intermediate plenum is defined within the housing that directs pressurized air from one runner to another runner corresponding to the next cylinder in the firing sequence of the engine. Valves regulate the transfer of pressurized air between the runners for increased torque output over a predetermined range of engine speed.

20 Claims, 5 Drawing Sheets

INTAKE MANIFOLD TUNING ASSEMBLY

BACKGROUND OF THE INVENTION

1. Field of the Invention

The present invention relates, generally, to an air intake manifold for an internal combustion engine, and, more specifically, to an intake manifold tuning assembly that efficiently directs air toward the combustion chamber.

2. Description of the Related Art

Internal combustion engines known in the related art may generally include, among other basic components, an air intake manifold and an engine block having one or more cylinders and one or more pistons supported for reciprocal movement in each cylinder. The air intake manifold receives air from a throttle body and directs the air into one or more plenums. Typically, the air intake manifold includes two plenums each having runners that direct air toward alternating cylinders along the engine's firing sequence. By way of example, in a six cylinder engine, the runners would direct air from one plenum to cylinders 1, 3 and 5 and the runners from the other plenum would direct air to cylinders 2, 4 and 6.

At least one intake valve is disposed between the runner and the cylinder to regulate air induction into the combustion chamber. More specifically, during the downward stroke of the piston, the intake valve is open and air is drawn from the runner into the cylinder. Subsequently, the intake valve closes as the piston travels along an upward stroke where the air within the combustion chamber is compressed and combusted. This process is repeated within each cylinder along firing order. However, as the intake valve closes, air within the runner continues to rush toward the cylinder, which creates an increase in air pressure. The difference in pressure between the air in the runner and the air within the plenum causes a disturbance that results in undesirable noise, vibration and harshness ("NVH") within the engine.

To address this problem, conventional tuning assemblies have been employed to control the flow path of air within the air intake manifold. Generally speaking, a conventional tuning assembly includes a valve that equalizes the air pressure between the two plenums, thereby reducing the likelihood of a disturbance that results in NVH. However, conventional tuning assemblies generally consume a large area ("footprint") within the engine compartment which is undesirable in the highly competitive industry of automobile manufacturing.

In addition to the constant motivation within the automobile industry to reduce the size of components within the engine compartment, there is an ongoing need to improve engine performance. While conventional tuning assemblies are directed toward equalizing pressure differences, they provide only de minimus improvement with regard to engine performance. More specifically, it is known that increased air density within the combustion chamber will provide improved combustion efficiency and greater engine performance. However, most conventional tuning assemblies merely provide a "blow-by" valve, which passively directs air between the plenums when the pressure difference exceeds a predetermined range. Other conventional tuning assemblies are known to include a power-actuated valve that transfers air between the plenums based on a predetermined set of values corresponding to pressure change, temperature, engine speed, or the like. Such power-actuated assemblies generally suffer from the above-noted disadvantages, namely a large footprint.

Thus, while the pressure equalization between plenums offered by conventional tuning assemblies may provide for a reduction in NVH, they do not effectively utilize the increased air pressure to improve engine performance. More specifically, conventional tuning assemblies do not effectively provide for the efficient redirection of pressurized air toward the next combustion chamber in the firing order for increased engine torque, especially at lower engine speeds. Rather, due to the travel distance of pressurized air from one runner through the plenums and into another runner required by known tuning assemblies only a negligible amount of the pressurized air reaches the next combustion chamber along the firing order.

As a result, there is an ongoing need in the art to improve the induction of air from the intake manifold to the combustion chamber to increase the efficiency of an internal combustion engine, in general. Specifically, there is an ongoing need for an intake manifold tuning assembly that provides a streamlined path through which pressurized air is directed toward consecutive cylinders in the firing order for increased torque output at lower engine speeds. There is also a need in the art for an intake manifold tuning assembly that actively regulates the flow path of air to cylinders for improved torque output while reducing its footprint within the engine compartment.

SUMMARY OF THE INVENTION

The present invention overcomes the disadvantages in the related art in an intake manifold tuning assembly that streamlines the flow path of pressurized air toward next cylinders in the engine firing sequence for improved torque output within a predetermined range of engine speed. To this end, the present invention includes an intake manifold including first and second plenums that are operatively attached to the throttle body of an internal combustion engine. The present invention further includes a plurality of runners depending from the first and second plenums to direct air into the cylinders of an internal combustion engine and each of the runners include a vent adapted to release pressurized air within the runner. The intake manifold tuning assembly further includes a tuning device disposed between the first and second plenums. The tuning device includes a housing operatively attached to the runners and an intermediate plenum defined within the housing. The housing further includes a plurality of tuning ports aligned with respect to the vents. The tuning ports are adapted to receive pressurized air from the runners and the intermediate plenum is adapted to direct pressurized air from one of the runners toward another runner corresponding to the next cylinder in the firing sequence of an internal combustion engine. The tuning device further includes a plurality of valves adapted to regulate the transfer of pressurized air between the runners and the intermediate plenum to provide increased torque output over a predetermined range of engine speed.

Accordingly, one advantage of the present invention is it streamlines the flow of pressurized air by providing communication between consecutive runners corresponding to the next cylinders along the firing sequence of an engine.

Another advantage of the present invention is that it optimizes the local high pressure air volume stored in one runner by providing an intermediate plenum that re-directs the pressurized air into another runner corresponding to the next cylinder in the firing sequence of an engine.

Yet another advantage of the present invention is that it actively adjusts the engine torque output over and intended engine speed range for improved performance by providing an actuated valve that regulates the flow path of local high pressure air volume in response to engine speed.

Yet another advantage of the present invention is that it provides a tuning device disposed between the plenums and operatively attached to the runners for a reduced footprint within the engine compartment.

Other objects, features, and advantages of the present invention will be readily appreciated, as the same becomes better understood, after reading the subsequent description taken in conjunction with the accompanying drawings.

DETAILED DESCRIPTION OF THE INVENTION

Figure 1:
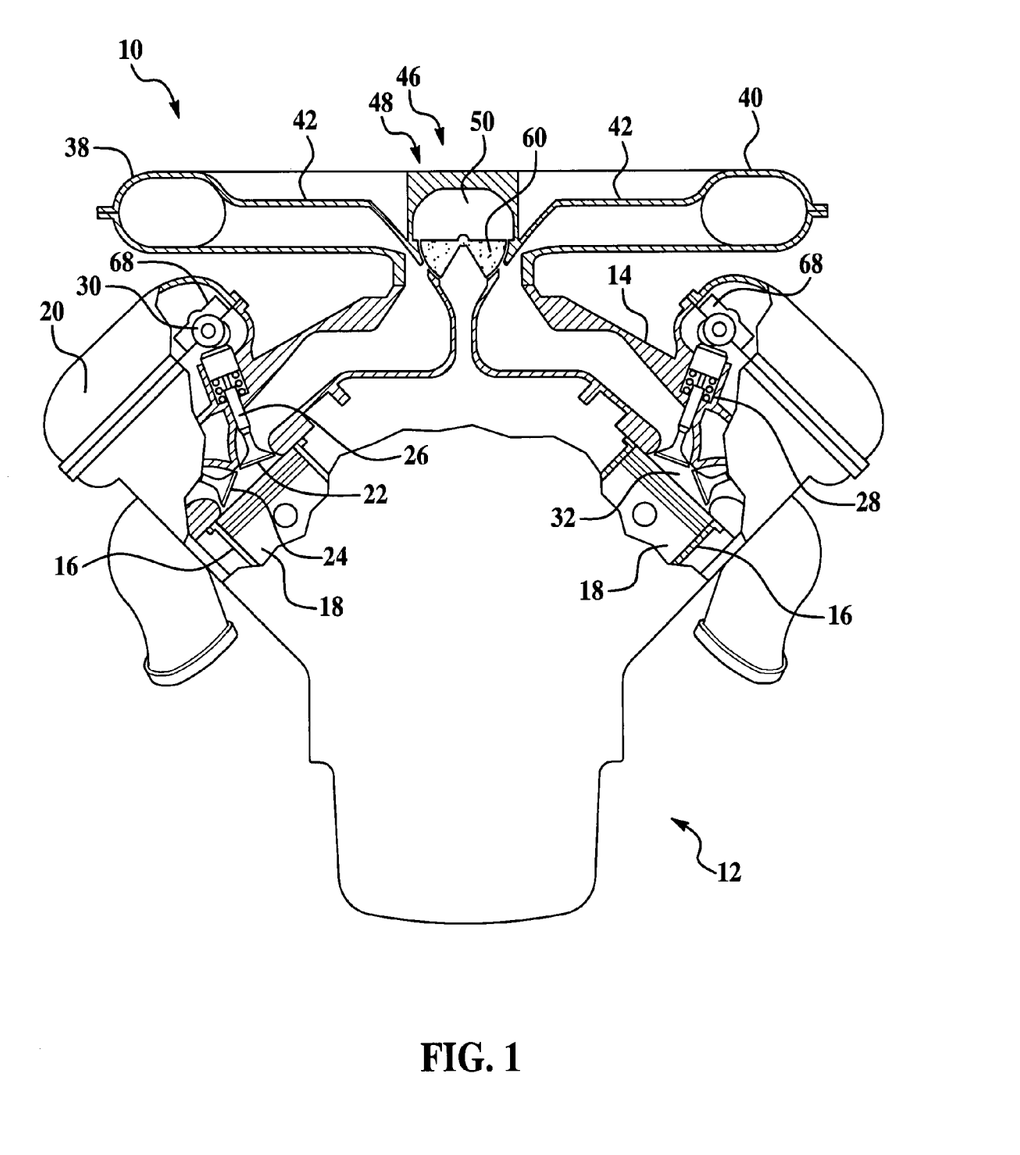
FIG. 1 is a partial cross-sectional side view of an internal combustion engine and intake manifold tuning assembly in accordance with the present invention.

An intake manifold tuning assembly of the present invention is generally indicated at 10 throughout the figures, where like numbers are used to designate like structures throughout the drawings. As shown in FIG. 1, the present invention is particularly adapted for use in an internal combustion engine, generally indicated at 12. In this case, the assembly 10 of the present invention is illustrated in connection with a multi-cylinder internal combustion engine 12 having a dual-overhead cam arrangement. Those having ordinary skill in the art will appreciate that the engine 12 is but one of the many internal combustion engines with which the present invention may be employed. By way of example, the present invention may be employed in a two-stroke or four-stroke engine. The cylinders may be arranged in an in-line, v-shaped, or flat manner or in any other manner commonly known in the art. The present invention may also be employed with a carbureted or fuel injected internal combustion engine having single or dual overhead or undermounted cam(s).

With continuing reference to FIG. 1, the internal combustion engine 12 includes an engine block 14 having multiple cylinders 16, and pistons 18, which are supported for reciprocal movement in the cylinders 14. The engine 12 further includes a cylinder head 20 that supports an intake valve 22 and an exhaust valve 24, each having valve stems 26 and valve springs 28. The intake valves 22 and exhaust valves 24 are opened and closed via camshafts 30 to provide fluid communication between the cylinders 14 and the intake valves 22 and the exhaust valves 24. The internal combustion engine 12 may also include spark plugs (not shown) for igniting the fuel within the combustion chamber 32 defined by the cylinder 16 and the piston 18. The engine 12 may further include a fuel injector (not shown) as a means of introducing atomized fuel into the combustion chamber 32. Thus, the present invention may be employed in connection with both a spark ignition or compression ignition (diesel) engine. Those having ordinary skill in the art will appreciate that the engine 12 also includes a number of other conventional components that are commonly known in the art and that will not be described in detail here.

Referring to FIGS. 1-5B, the intake manifold tuning assembly 10 is operatively disposed between the engine block 14 and the throttle body, generally indicated at 34. The throttle body 34 is adapted to introduce air into the intake manifold tuning assembly 10 in response to input from the operator of a vehicle. More specifically, as the vehicle operator engages the accelerator or gas pedal of the vehicle (not shown), the throttle body 34 delivers an appropriate amount of air toward the combustion chamber 32 to ensure sufficient combustion. Accordingly, the throttle body 34 includes a control valve 36 to deliver the air to the intake manifold tuning assembly 10.

The intake manifold tuning assembly 10 of the present invention is adapted to receive air from the throttle body 34. More specifically, the intake manifold tuning assembly 10 includes first and second plenums, 38 and 40, respectively, that are operatively attached to the throttle body 34 and adapted to chamber air for distribution to the combustion chambers 32. The intake manifold tuning assembly 10 further includes a plurality of runners 42 disposed between the plenums 38 and 40 and the engine block 14. Each of the runners 42 depend from either the first or second plenum 38 and 40 and correspond to a particular cylinder 16.

During engine operation, opening the intake valve 22 creates a vacuum, which draws air from one of the plenums 38 or 40 through a runner 42 and into the cylinder 16. As the piston 18 moves upward within the cylinder 16, the intake valve 22 closes. Following combustion of the air-fuel mixture, the exhaust valve 24 opens to release the exhaust. In this manner, the efficiency of the engine 12 is directly related to the volume of combustible air within the combustion chamber 32. Accordingly, an increase in air pressure within the combustion chamber 32 will result in an increase in engine efficiency and improve performance.

Within a multi-cylinder internal combustion engine 12, air is drawn from alternating plenums 38 or 40 in order to provide sufficient air to each combustion chamber 32. By way of example, in a six-cylinder engine 12 where the firing sequence is 1-6, cylinders 1, 3, and 5 would draw air from the first plenum 38 and cylinders 2, 4 and 6 would draw air from the second plenum 40 via corresponding runners 42. However, air within the runner 42 continues to move toward the cylinder 16 even as the intake valve 22 closes. The pressure of the air within the runner 42 increases behind the closed intake valve 22. The increased air pressure within the runner 42 results in NVH as it attempts to equalize relative to the air pressure within the plenum 38 or 40. Furthermore, while the increased air pressure would provide improved combustion down the firing sequence, the travel distance between runners 42 via the plenums 38 and 40 is too great to result in any noticeable improvement in engine performance.

Figure 5A:
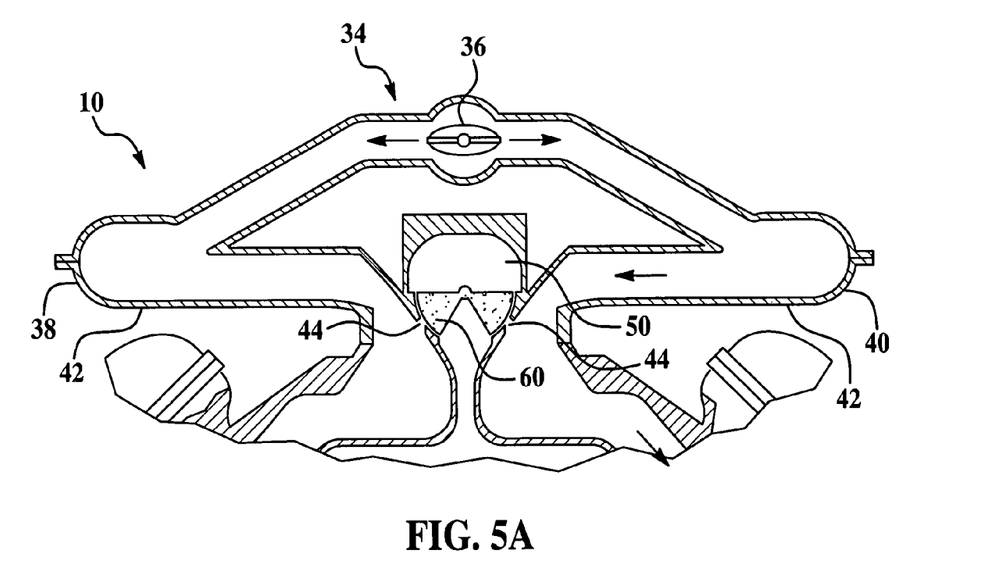
FIG. 5A is a side cross-sectional view of the intake manifold tuning assembly illustrating the air flow path when the valves are in a closed position in accordance with the present invention.
Figure 5B:
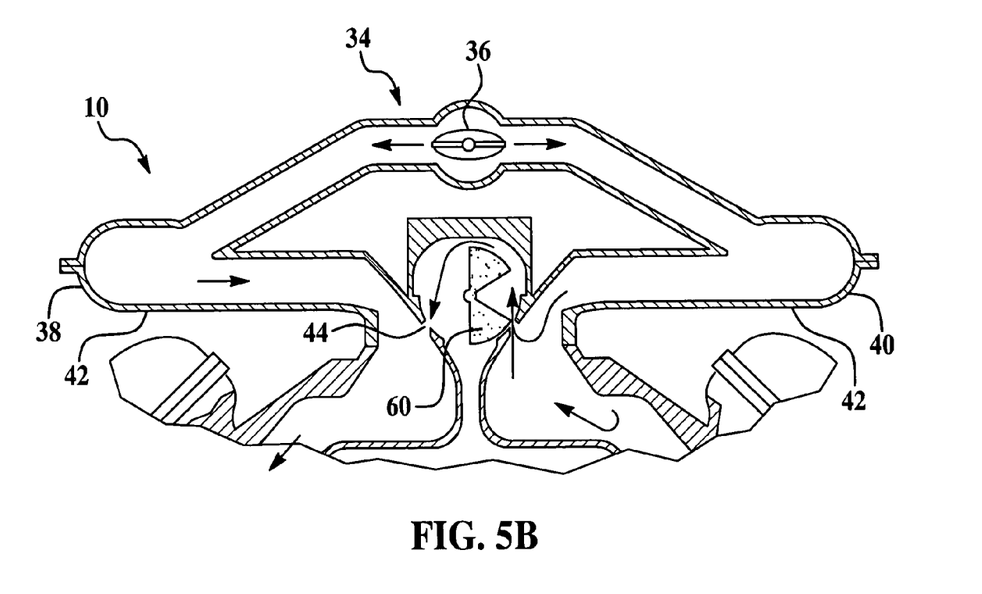
FIG. 5B is a partial cross-sectional side view of the intake manifold tuning assembly illustrating the air flow path when the valves are in an open position in accordance with the present invention.

Accordingly, the runners 42 of the present invention include vents 44 that are adapted to release the pressurized air. The vents 44 are adapted to facilitate the transfer of pressurized air between runners 42 corresponding to the next cylinder 16 in the firing sequence. In this manner, the pressurized air previously trapped within one runner 42 may be efficiently utilized within the next combustion chamber 32 in the firing sequence. As shown in FIGS. 5A and 5B, the vents 44 are operatively disposed along within the runners 42 in proximate relation to the engine block 14, thereby reducing the travel distance of the pressurized air between runners 42. Those having ordinary skill in the art will appreciate that the vents 44 may be defined within in the runners 42 via any suitable method of manufacture. By way of example, the vents 44 may be drilled following production of the runners 42. Further by way of example, the vents 44 may be provided within the runners 42 during a casting process.

Referring once again to FIGS. 1-5B, the present invention further includes a tuning device, generally indicated at 46. The tuning device 46 is operatively disposed between the first and second plenums 38 and 40. More specifically, the tuning device 46 is attached to the runners 42 to provide a reduced footprint and improved clearance within the engine compartment of a vehicle. The tuning device 46 includes a housing, generally indicated at 48 and an intermediate plenum 50 defined within the housing 48. The intermediate plenum 50 is adapted to direct pressurized air from one of the runners 42 toward another runner 42 corresponding to the next cylinder 16 in the firing sequence. Those having ordinary skill in the art will appreciate that while the housing 48 is shown within FIGS. 2 and 3 attached to the runners 42 by bolts 52, the present invention is not limited by such structure. By way of example, the housing 48 may be welded to the runners 42 or integrated with the runners 42 during casting.

Figure 2:
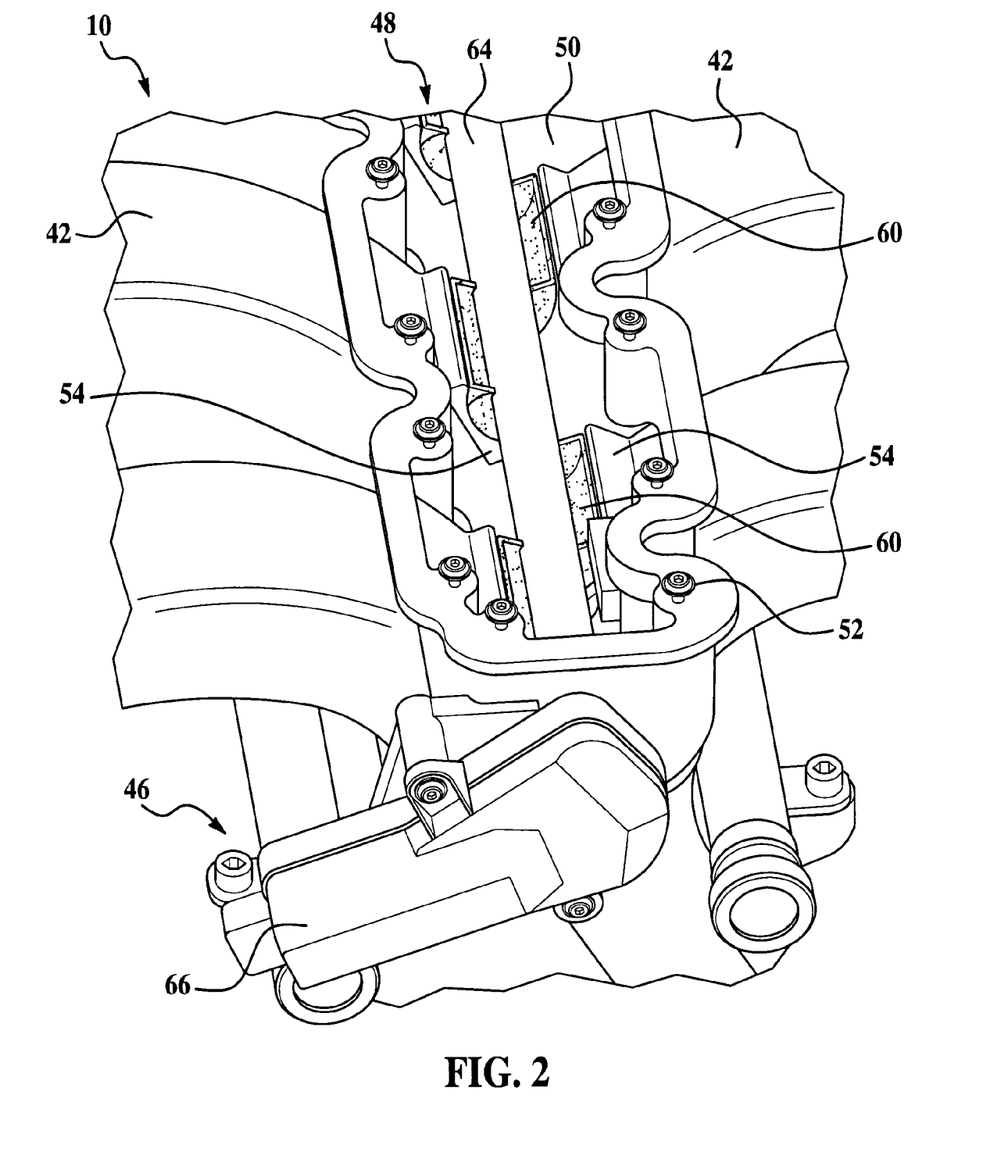
FIG. 2 is a fragmentary top perspective view of the intake manifold tuning assembly where the valves are in a closed position in accordance with the present invention.
Figure 3:
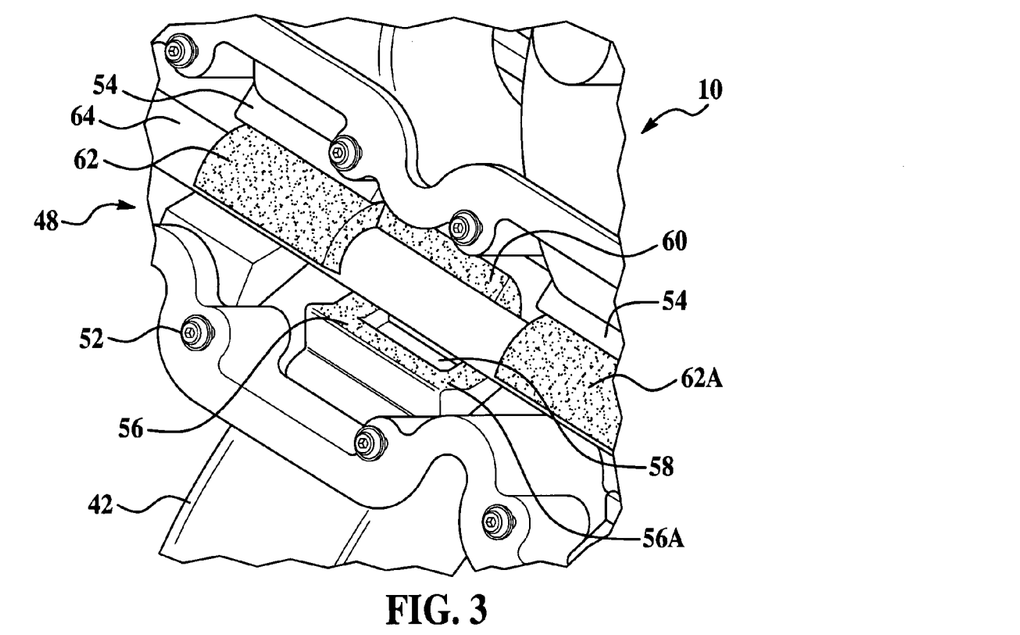
FIG. 3 is a fragmentary top perspective view of the intake manifold tuning assembly where the valves are in an open position in accordance with the present invention.

Referring specifically to FIGS. 2 and 3, the housing 48 further includes a plurality of platforms 54 defined within the intermediate plenum 50. Each of the platforms 54 includes a deck 56 that is adapted to assist in the control of air flow between the intermediate plenum 50 and the runners 42, as will be described in greater detail below. The housing 48 further includes a plurality of tuning ports 58. The tuning ports 58 are aligned with respect to the vents 44 and are adapted to facilitate the transfer of pressurized air between the runners 42 and the intermediate plenum 50. As shown in the Figures, the tuning ports 58 are disposed on the deck 56 and are defined within the platforms 54. However, those having ordinary skill in the art will appreciate that the housing 48 of the present invention is not limited to tuning ports 58 that are defined within platforms 54. By way of example, the housing 48 may not include platforms 54 at all. Rather, the housing 48 may include substantially planar surfaces within the intermediate plenum 50 to accomplish the intended objective.

Figure 4A:
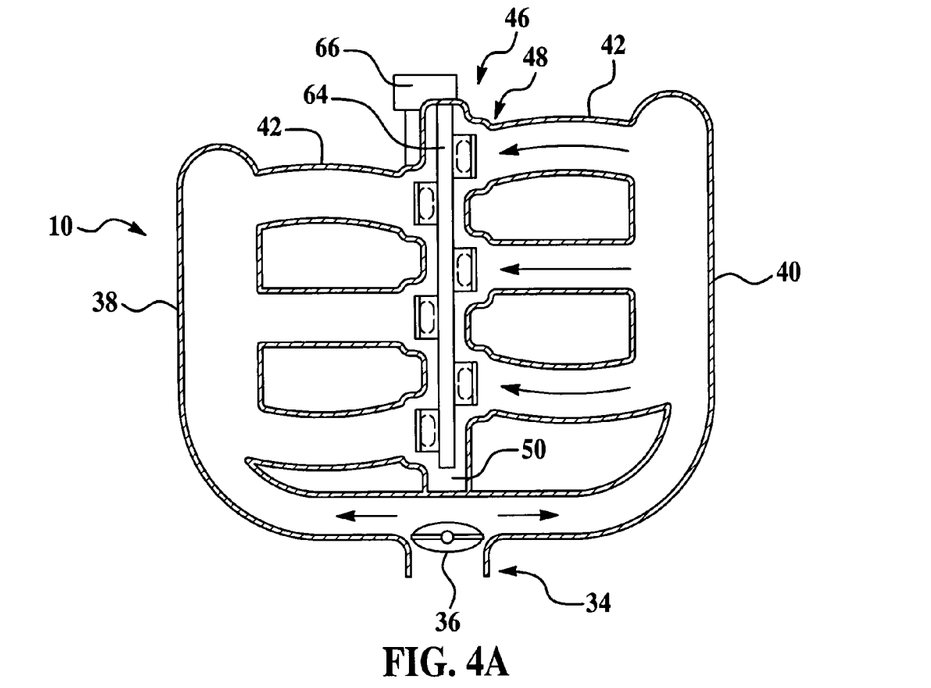
FIG. 4A is a top cross-sectional view of the intake manifold tuning assembly illustrating the air flow path when the valves are in a closed position in accordance with the present invention.

The tuning device 46 further includes a plurality of valves 60 that are adapted to regulate the transfer of pressurized air between the runners 42 and the intermediate plenum 50 for increased torque output over a predetermined range. The valves 60 include a faceplate 62 that is operatively disposed adjacent to the tuning ports 58 and adapted to seal the intermediate plenum 50 from the vents 44 without actually contacting a portion of the housing 48. More specifically, the faceplate 62 includes a contoured profile that corresponds to the contoured profile of the deck 56. As shown in FIGS. 2 and 3, the contoured profiles of the faceplate 62 and the deck 56 are substantially arcuate. Furthermore, the faceplate 62 and the deck 56 each include a textured surface 62a and 56a, respectively, that is adapted to provide a tortuous airflow path. In this manner, the faceplate 62 and the deck 56 substantially seal the intermediate plenum 50 from the runners 42 without physical contact therebetween, when the valves 60 are in a closed position. (FIG. 4A).

With continuing reference to FIGS. 2 and 3, the tuning device 46 further includes a shaft 64 that is operatively disposed within the housing 48. The valves 60 are attached to the shaft 64 to provide for uniform valve movement relative to each tuning port 58. More specifically, the shaft 64 is adapted to rotate within the intermediate plenum 50 so as to adjust the valves 60 between open and closed positions. Those having ordinary skill in the art will appreciate that while the shaft 64 is described a providing rotational movement of the valves 60 relative to the tuning ports 58, other movements that accomplish the same end may also be employed. By way of example, the shaft 64 may be adapted to provide vertical movement of the valves 60 relative to the tuning ports 58 to maintain the tortuous airflow path that substantially seals the intermediate plenum 50 from the runners 42 without physical contact therebetween, when the valves 60 are in a closed position.

The tuning device 46 further includes an actuator 66 operatively disposed along one end of the housing 48 and attached to the shaft 64 to control the movement of the valves 60. More specifically, the actuator 66 adjusts the valves 60 between open and closed positions to actively control the transfer of pressurized air through the intermediate plenum 50 in response to engine speed, as will be described in greater detail below. In the preferred embodiment, the actuator 66 is electro-mechanically controlled. However, those having ordinary skill in the art will appreciate that the actuator 66 may be controlled by electronic, pneumatic or hydraulic operation.

The tuning device 46 further includes a sensor 68 that is adapted to sense the speed of the internal combustion engine 12 and transmit a signal to the actuator 66 to move the valves 60. As shown in FIG. 1, the sensor 68 is operatively attached to the camshaft 30 to monitor engine RPMs. However, those having ordinary skill in the art will appreciate that engine speed may be monitored through several locations within an internal combustion engine 12. By way of example, the sensor 68 may be operatively attached to the crankshaft or driveshaft. Further by way of example, engine speed may be measured by the vehicle's computer, oil pressure or the level of throttle engagement.

Figure 4B:
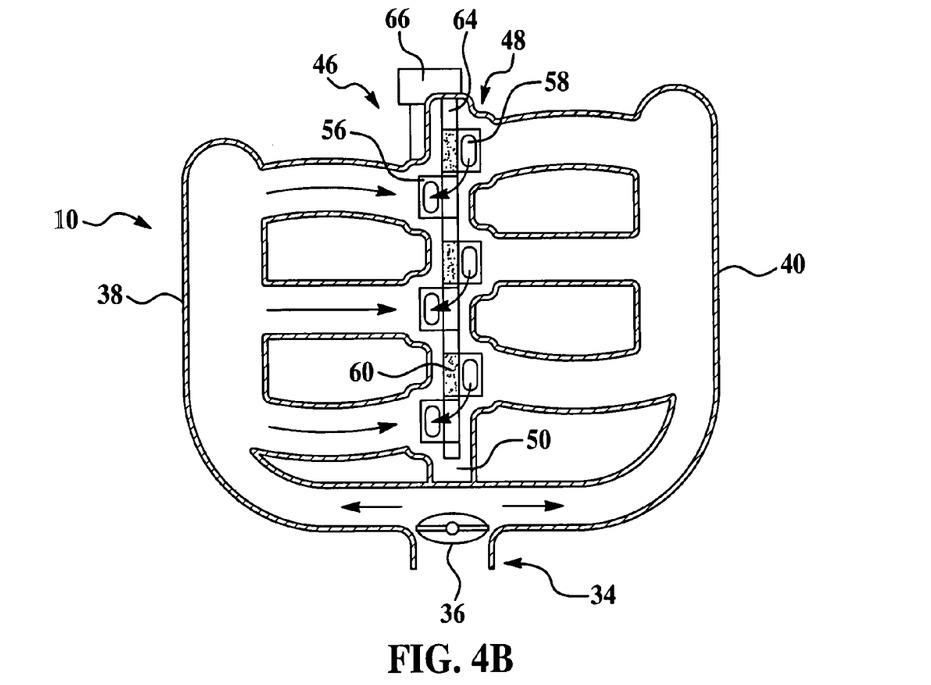
FIG. 4B is a top cross-sectional view of the intake manifold tuning assembly illustrating the air flow path when the valves are in an open position in accordance with the present invention.

The tuning device 46 of the present invention provides active monitoring and adjustment of the flow path of pressurized air between the runners 42 and the intermediate plenum 50 based on engine speed. More specifically, the actuator 66 maintains the valves 60 in a closed position until the engine speed is within a predetermined range (FIGS. 1, 2, 4a and 5a). Furthermore, where the engine speed is within the predetermined range, the actuator 66 will open the valves 60 to enable the pressurized air to flow between runners 42 via the intermediate plenum 50 for improved engine performance (FIGS. 3, 4b and 5b).

Figure 6:
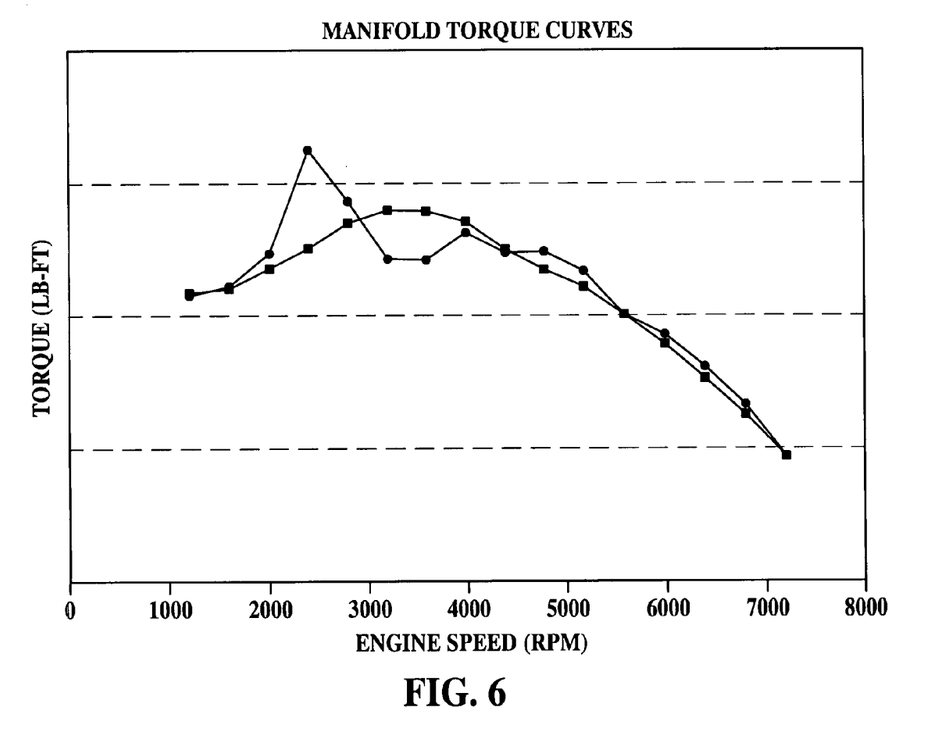
FIG. 6 is a chart illustrating the torque output advantage of an internal combustion engine having an intake manifold tuning assembly in accordance with the present invention in comparison with an internal combustion engine having a conventional intake manifold.

FIG. 6 shows the torque benefit of the intake manifold tuning assembly 10 of the present invention over a conventional manifold. The data displayed in FIG. 6 is derived from simulation software. The circle line indicates the torque curve from an engine using an intake manifold without any tuning. As this graph indicates, there is a drop in torque between ~3000 and 4000 RPM. The block line represents the torque output from the same engine using the intake manifold tuning assembly 10 of the present invention. As the graph indicates, the torque output between ~3000 and 4400 RPM is improved. Accordingly, the predetermined operational range of the intake manifold tuning device 10 of the present invention is between 2,800 and 4,500 RMP. In the preferred embodiment, the actuator 66 maintains the valves 60 in a closed position until the engine speed reached 3,000 RPM. Upon reaching engine speeds between 3,000 and 4,400 RPM the actuator 66 would maintain the valves 60 in an open position. Finally, where the engine speed exceeds 4,400 RPM, the actuator 66 again maintains the valves 60 in a closed position. However, it should be appreciated that the range of engine speed at which the present invention provides torque benefits are specific to each type of engine, as well as the architecture of each intake manifold. As a result, the range of engine speed at which the torque benefit is achieved may vary from engine to engine and from intake manifold to intake manifold.

The present invention provides an actuator 66 that maintains the valves 60 in an open position over a predetermined range of engine speed for the communication of pressurized air between consecutive runners 42 in the firing order. As a result, the present invention directs the local high pressure air volume from the inducted flow of one runner 42 as the intake valve closes to the next consecutive cylinder 16 in the firing order for improved torque output from the engine 12 over a predetermined range. Additionally, the present invention provides for a reduced length of the air flow path between consecutive cylinders 16 in the firing order. As a result, the present invention provides increased air density within the combustion chambers 32 over a predetermined engine speed for improved combustion. The present invention includes a tuning device 46 that is disposed between the plenums 38 and 40 and operatively attached to the runners 42. As a result, the present invention provides for a reduction in NVH and an increase in engine performance as well as a reduction in the footprint of a manifold tuning device within the engine compartment.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. An intake manifold tuning assembly for an internal combustion engine, said intake manifold tuning assembly comprising:
    an intake manifold including first and second plenums in fluid communication with the throttle body of an internal combustion engine and a plurality of runners depending from said first and second plenums to direct air into the cylinders of an internal combustion engine, each of said runners having a vent adapted to release pressurized air within said runner;
    a tuning device disposed between said first and second plenums including a housing operatively attached to said runners, said housing having a plurality of tuning ports aligned with respect to said vents to receive pressurized air from said runners and an intermediate plenum defined within said housing that is adapted to direct pressurized air from one of said runners toward another of said runners corresponding to the next cylinder in the firing sequence of an internal combustion engine;
    said tuning device further including a plurality of valves adapted to regulate the transfer of pressurized air between said runners and said intermediate plenum for increased torque output over a predetermined range of engine speed.

2. The intake manifold tuning assembly as set forth in claim 1 wherein said tuning device further includes an actuator adapted to adjust said valves between open and closed positions to actively control the transfer of pressurized air through said intermediate plenum.

3. The intake manifold tuning assembly as set forth in claim 2 wherein said tuning device further includes a shaft extending from said actuator and through said intermediate plenum, said shaft adapted to rotate said valves between open and closed positions as directed by said actuator.

4. The intake manifold tuning assembly as set forth in claim 1 wherein said tuning device further includes a sensor adapted to sense the speed of the internal combustion engine and transmit a signal to open said valves when the engine speed is within a predetermined range.

5. The intake manifold tuning assembly as set forth in claim 4 wherein said predetermined range at which said valves are actuated into an open position corresponds to an engine speed between 2,800 and 4,500 rpm.

6. The intake manifold tuning assembly as set forth in claim 1 wherein said valves further include a faceplate operatively disposed adjacent to said tuning ports to substantially seal said intermediate plenum from said vents without actual contact between said valves and said housing when said valves are in a closed position.

7. The intake manifold tuning assembly as set forth in claim 6 wherein said faceplate includes a textured surface that is adapted to provide a tortuous airflow path to facilitate the sealing operation between said intermediate plenum and said vents when said valves are in a closed position.

8. The intake manifold tuning assembly as set forth in claim 1 wherein said housing includes a plurality of platforms corresponding to the number of said tuning ports, each of said platforms includes an arcuate deck that surrounds said tuning ports and cooperates with said valves to substantially seal said intermediate plenum from said vents without actual contact between said arcuate deck and said valves when said valves are in a closed position.

9. The intake manifold tuning assembly as set forth in claim 8 wherein said arcuate deck includes a textured surface that is adapted to provide a tortuous airflow path to facilitate the sealing operation between said intermediate plenum and said vents when said valves are in a closed position.

10. A tuning device for an intake manifold of an internal combustion engine, said tuning device comprising:
    a housing adapted to be operatively attached to the runners of an intake manifold, said housing having a plurality of tuning ports aligned with respect to the vents defined within the runners and an intermediate plenum defined within said housing that is adapted to direct pressurized air from one runner toward another runner corresponding to the next cylinder in the firing sequence of an internal combustion engine;
    a plurality of valves disposed within said intermediate plenum and adjacent to said tuning ports, said valves are adapted to regulate the transfer of pressurized air between the runners and said intermediate plenum; and
    an actuator adapted to adjust said valves between open and closed positions in response to engine speed to actively control the transfer of pressurized air between said intermediate plenum and the runners for increased torque output over a predetermined range of engine speed.

11. The tuning device as set forth in claim 10 further includes a shaft extending from said actuator and through said intermediate plenum, said shaft adapted to rotate said valves between open and closed positions as directed by said actuator.

12. The tuning device as set forth in claim 10 further includes a sensor adapted to sense the speed of the internal combustion engine and signal said actuator to open said valves when the engine speed is within a predetermined range.

13. The tuning device as set forth in claim 12 wherein said predetermined range at which said valves are actuated into an open position corresponds to an engine speed between 2,800 and 4,500 rpm.

14. The tuning device as set forth in claim 10 wherein said valves further include faceplate operatively disposed adjacent to said tuning ports to provide minimal clearance therebetween so as to substantially seal said intermediate plenum from the runner vents without actual contact between said valves and said housing when said valves are in a closed position.

15. The tuning device as set forth in claim 14 wherein said faceplate includes a textured surface that is adapted to provide a tortuous airflow path to facilitate the sealing operation between said intermediate plenum and the runner vents when said valves are in a closed position.

16. The tuning device as set forth in claim 10 wherein said housing includes a plurality of platforms corresponding to the number of said tuning ports, each of said platforms include an arcuate deck that surrounds said tuning ports and cooperates with said valves to substantially seal said intermediate plenum from the runner vents without actual contact between said arcuate deck and said valves when said valves are in a closed position.

17. The tuning device as set forth in claim 16 wherein said arcuate deck includes a textured surface that is adapted to provide a tortuous airflow path to facilitate the sealing operation between said valves and said arcuate deck when said valves are in a closed position.

18. An intake manifold assembly for an internal combustion engine, said intake manifold assembly comprising:
   first and second plenums in fluid communication with the throttle body of an internal combustion engine;
   a plurality of runners depending from said first and second plenums to direct air from one of said first and second plenums into the cylinders of an internal combustion engine, each of said runners having a vent adapted to release pressurized air within said runner, said vents adapted to facilitate the transfer of pressurized air between runners corresponding to cylinders in the next firing sequence of an internal combustion engine for increased torque output over a predetermined range of engine speed.

19. An intake manifold assembly as set forth in claim 18 wherein said vents are adapted to operatively engage a tuning device that is adapted to regulate the transfer of pressurized air between said runners.

20. An intake manifold assembly as set forth in claim 19 wherein said vents are disposed along an intermediate position within said runners to position the tuning device between said first and second plenums for improved clearance within the engine compartment of an internal combustion vehicle.

* * * * *